March 5, 1929.　　E. R. GREER ET AL　　1,704,430
POWER DUMPING MECHANISM
Filed Jan. 10, 1925　　3 Sheets-Sheet 1
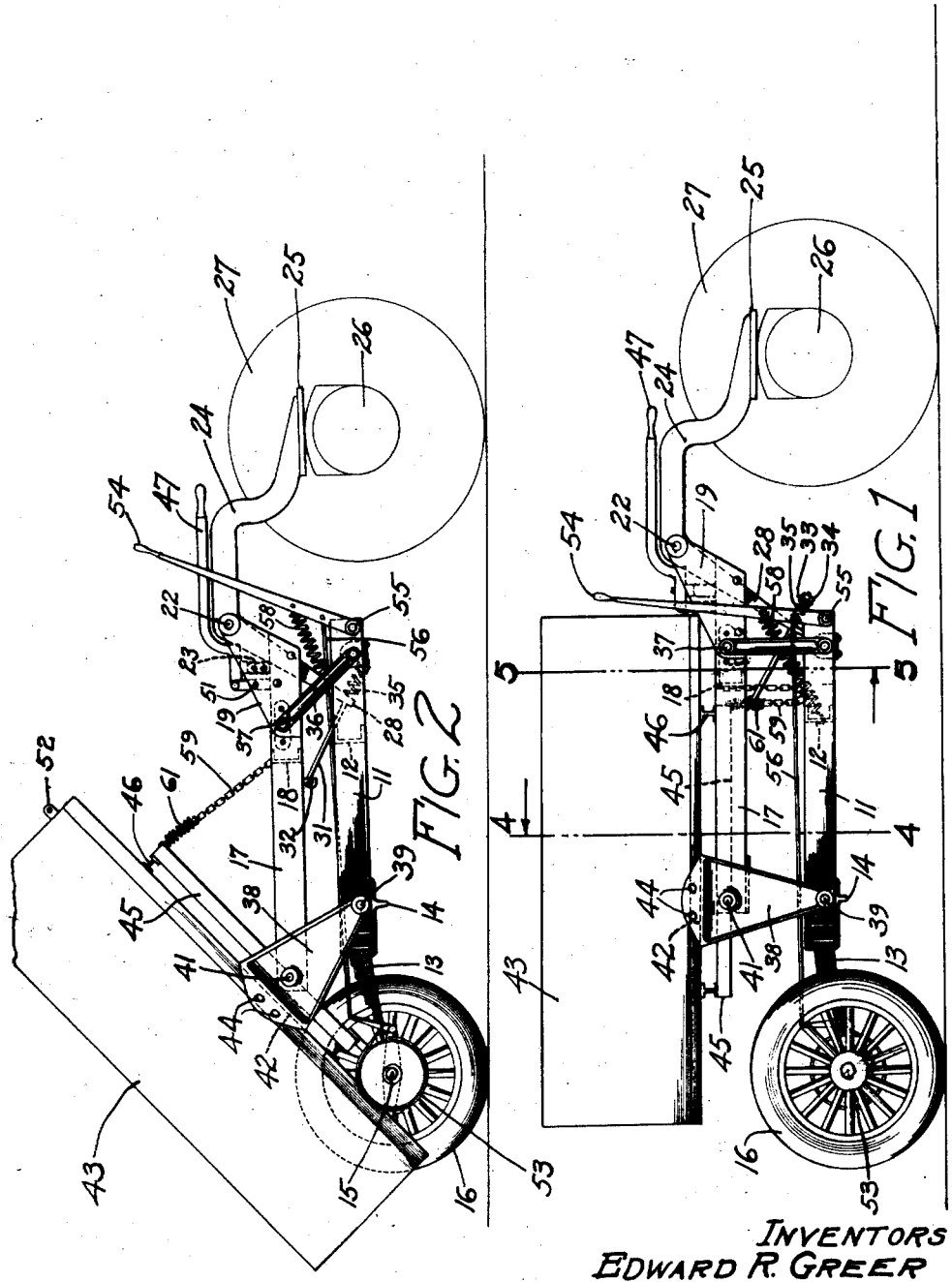
INVENTORS
EDWARD R. GREER
EMMETT L. CARSON
ATTORNEYS March 5, 1929. E. R. GREER ET AL 1,704,430
POWER DUMPING MECHANISM
Filed Jan. 10, 1925  3 Sheets-Sheet 2
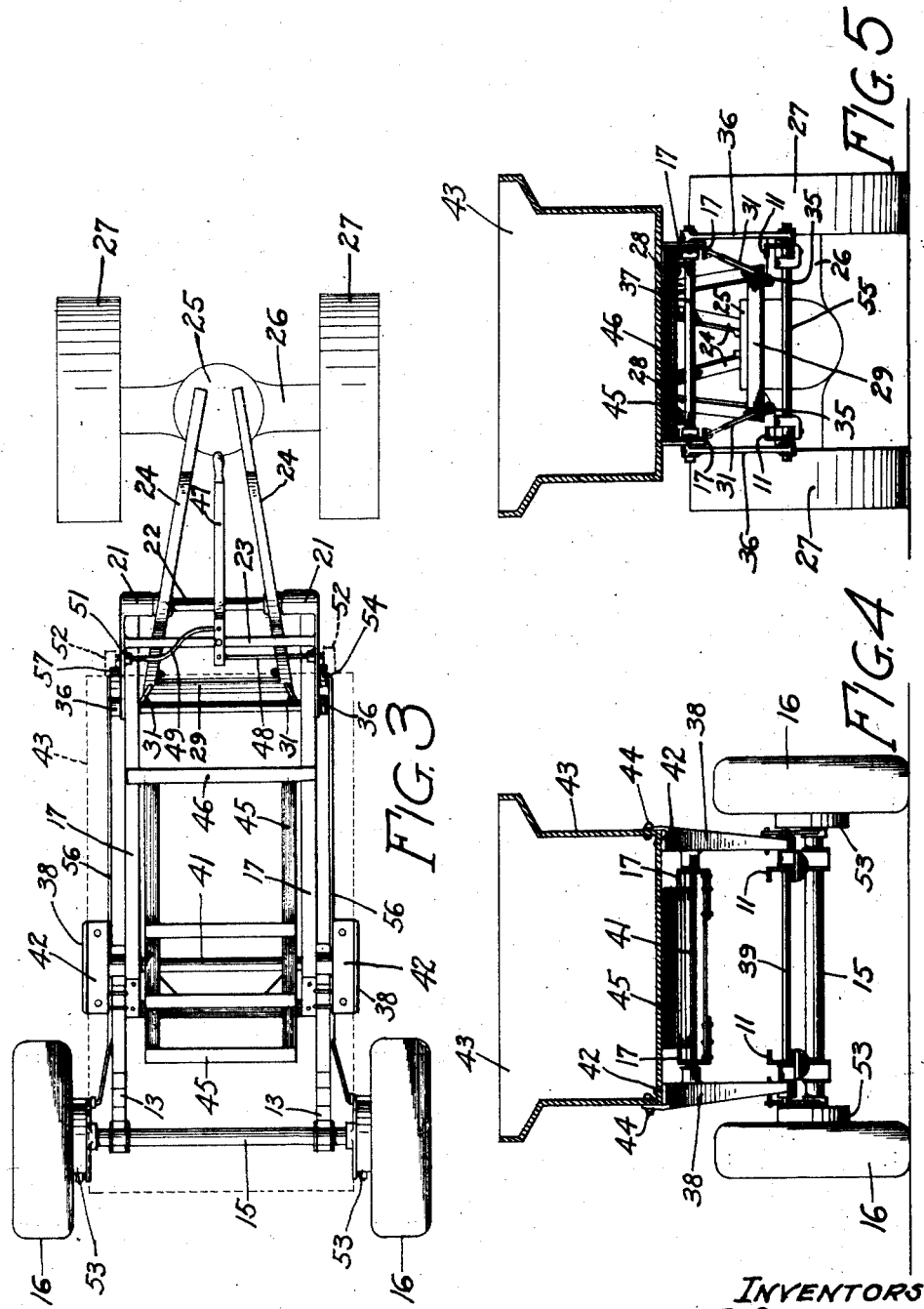
INVENTORS
EDWARD R. GREER
EMMETT L. CARSON
BY Paul, Paul & Moore
ATTORNEYS

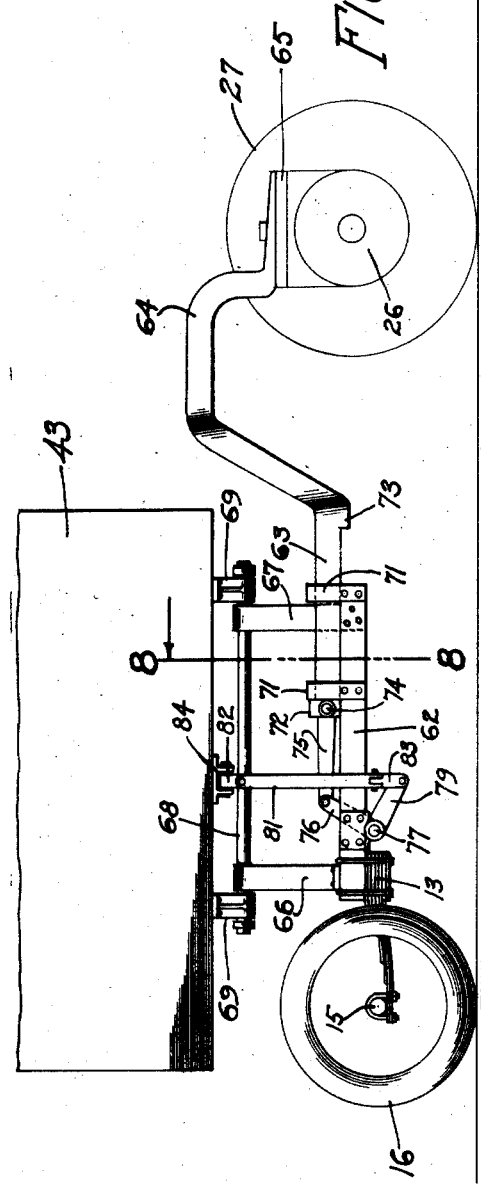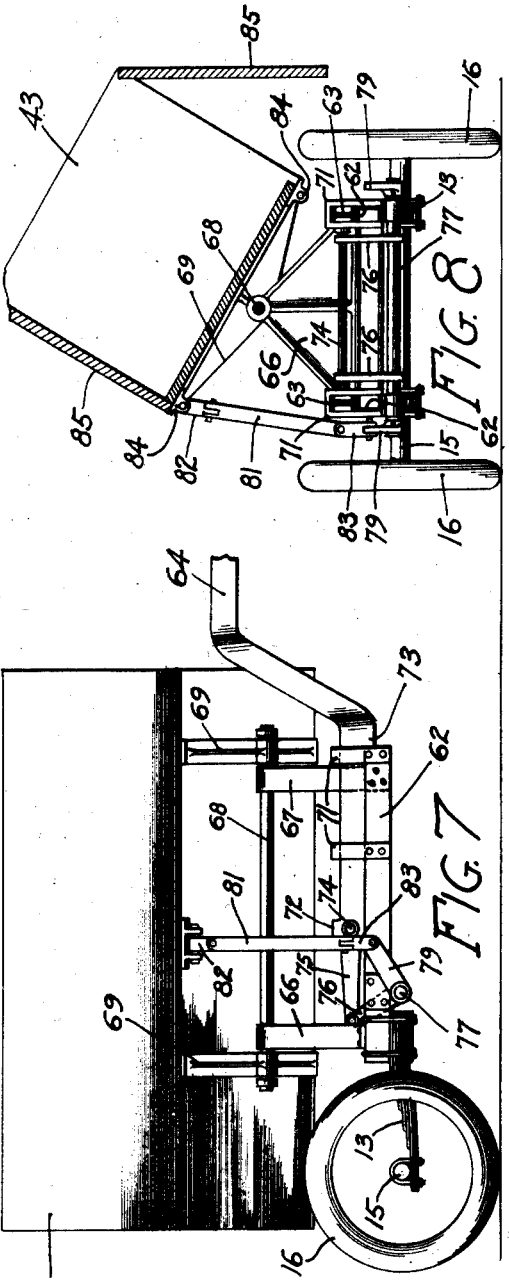
INVENTORS
EDWARD R. GREER
EMMETT L. CARSON
BY
ATTORNEYS

Patented Mar. 5, 1929.

1,704,430

UNITED STATES PATENT OFFICE.

EDWARD R. GREER, OF MINNEAPOLIS, AND EMMETT L. CARSON, OF ST. PAUL, MINNESOTA.

POWER DUMPING MECHANISM.

Application filed January 10, 1925. Serial No. 1,652.

This invention relates to new and useful improvements in a power dumping mechanism particularly adapted for use in conjunction with a trailer and a tractor or other prime mover therefor, to tilt or dump the usual box of a trailer, and more particularly relates to such a device which is adapted to utilize the tractive powder of the tractor to effect the dumping of the trailer box.

The primary object of this invention is to provide a power dumping mechanism of simple and inexpensive construction, having means whereby when it is desired to dump the trailer box a slight rearward movement of the tractor relative to the trailer will cause the box to be tilted to load-dumping position.

A further object of the invention is to provide a trailer having a frame comprising two sections, the lower frame section being connected to the carrying wheels of the trailer and the upper frame section being pivotally mounted on the lower frame section and having its forward end adapted to be coupled to the usual coupling provided on the tractor.

A further object is to provide a trailer frame comprising upper and lower frame sections and having the box pivotally mounted on the upper frame section in such a manner that when the tractor is rearwardly moved with relation to the trailer, the box will be tilted to load-dumping position.

A further object is to provide a trailer frame having a box pivotally mounted thereon and the frame also having means whereby when the tractor is rearwardly moved towards the trailer, the box will be tilted sidewise of the trailer frame to discharge its load.

Other objects of the invention will appear from the following description and the accompanying drawings and will be pointed out in the annexed claims.

In the drawings, there has been disclosed a structure designed to carry out the various objects of the invention but it is to be understood that the invention is not confined to the exact features shown as various changes may be made within the scope of the claims which follow.

In the drawings:

Figure 1 is a view in side elevation of the improved trailer frame showing the means provided for effecting the dumping of the box when the upper frame section is rearwardly moved with relation to the lower frame section by the tractive power of the tractor;

Figure 2 is a similar view showing the device in load-dumping position, one of the rear wheels having been removed in order to more clearly show the position of the box;

Figure 3 is a plan view of Figure 1 with the box removed from the trailer;

Figure 4 is a cross sectional view on the line 4—4 of Figure 1 showing the rear end of the trailer frame;

Figure 5 is a cross sectional view on the line 5—5 of Figure 1 showing the forward end of the trailer frame and also showing the tractor drive wheels;

Figure 6 is a view showing a modified construction wherein the box is adapted to be tilted or dumped sidewise instead of rearwardly;

Figure 7 is a view similar to Figure 6 showing the box and trailer frame in load-dumping position; and Figure 8 is a cross sectional view on the line 8—8 of Figure 6 with the box in the position shown in Figure 7.

In the selected embodiment of the invention here shown, there is illustrated a trailer having a lower frame section comprising the opposed side beams 11 connected together at their forward ends by means of a cross member 12. A suitable spring 13 is secured to the rear end of each side beam 11 by means of brackets 14 which are suitably secured to the ends of the beams. The flexible end of each spring 13 is connected to the rear axle 15 upon which the usual carrying wheels 16 are rotatably mounted as is common practice.

The upper section of the trailer frame preferably comprises a pair of similar opposed side beams 17 which are tied together by means of a similar cross member 18 having its ends suitably secured to the inner face of the side beams 17 to form a frame. A bracket 19 is secured to the forward end of each side beam 17 and each such bracket preferably has a hub 21 in which a shaft or rod 22 is mounted as shown in Figure 3. A cross member 23 has its ends secured to the brackets 19 thereby securely retaining the brackets 19 and therefore the forward end of the beams 17 in true alinement with each other.

The means provided for coupling the trailer to the usual tractor or other prime mover, preferably comprises a pair of diverging coupling beams 24 which are pivotally mounted upon the cross shaft 22 as shown in Figure 3. These coupling beams are preferably arched, as shown, in order to provide sufficient clearance for the drive wheels of the tractor when turning sharp corners such, for instance, as when it is desired to turn at right angles. The depending forwardly extending end portion of each coupling beam 24 is preferably secured to a suitable coupling plate 25 which is provided with suitable means, not shown, whereby it may readily and quickly be coupled to the usual tractor coupling mounted on the rear axle or end portion 26 of the tractor. The means provided for thus coupling the trailer frame to the tractor forms no part of the present invention and, therefore, is not shown in detail on the drawings. In the various figures of the drawings, the rear end portion 26 and the drive wheels 27 of the tractor only are shown.

Referring to Figures 1, 2, 3 and 5, it will be noted that each diverging coupling beam 24 is provided with a downwardly and rearwardly extending end-portion 28 which are suitably secured together by means of a cross member 29, clearly shown in Figures 3 and 5. In the drawings the cross member 29 is shown as being an integral part of the end-portions 28 of the coupling beams, but it is to be understood that if desired, this cross member may be independently constructed and secured to the terminals of the end portions 28. The lower ends of the depending end portions 28 of the coupling beams 24 are preferably yieldably connected to the side beams 17 of the upper frame section of the trailer frame. Such means preferably consists in slidably mounting a rod 31 in the lower end of each end portion 28 or in the cross member 29. The upper end of each rod 31 is suitably secured to the underside of its respective side beam 17 by such means as the eye-bolt 32, as is clearly shown in Figure 2. A washer 33 and nut 34 is mounted on the lower end of each rod 31 and a coiled spring 35 is interposed between the washer 33 and the adjacent face of the lower end portion 28 of each coupling beam 24. (See Figures 1 and 2.) By thus yieldably connecting the lower ends of the coupling beams to the side beams of the upper section of the trailer frame, it will be seen and understood that the forward end of the trailer will thereby be cushioned resulting from the fact that when the trailer frame is loaded the spring 35 will be under considerable compression as a result of the trailer frame tending to oscillate from its pivotal connection with the coupling beams.

The means provided for pivotally connecting together the upper and lower sections of the trailer frame preferably comprises a parallel link mechanism which will cause the two frame sections to be moved in parallel relation to each other when the upper frame section is being rearwardly moved by the tractive power of the tractor in the load dumping operation. Referring to Figures 1 and 2, it will be noted that the forward ends of the two trailer frame sections are connected together by a pair of links 36 which have their lower ends pivotally connected to the forward ends of the lower frame section and their upper ends similarly connected to the upper frame sections preferably by means of the transverse rod 37. The rear ends of the two frame members are similarly connected together by means of brackets 38 which have their lower ends pivotally mounted upon a cross-shaft 39 supported by the brackets 14 on the lower frame section and having their upper end portions pivotally connected to the rear ends of the upper frame section by means of a similar cross shaft 41 which may be suitably secured to either the brackets 38 or to the upper frame section 17.

A flanged seat 42 is provided on the upper end of each bracket 38 upon which the usual dump box 43 is seated and secured by such means as the bolts 44. A light frame structure 45 is secured to the underside of the box 43 to provide a reinforcement therefor. The forward cross beam 46 of the frame structure 45 is preferably of suitable length to engage the top face of the side beams 17 of the upper frame section when the box is in normal load-receiving position, as shown in Figures 1 and 3, thereby providing a support for the forward end of the box when in such position.

Means are also preferably provided for locking the box in load-receiving position as shown in Figure 1. Such means preferably consists in pivotally mounting a lever 47 on the cross member 23 adjacent the forward end portion of the upper frame section. Latches 48 and 49 are pivotally connected to the lever 47 and have their ends slidably mounted in guides 51 provided in the brackets 19 of the upper frame section. The ends of the latches 48 and 49 are adapted to engage a pair of apertured lugs 52 secured to the lower forward end of the box 43, when the box is in normal position as shown in Figure 1. By securely locking the forward end of the box to the forward end of the upper frame section, the two sections of the trailer frame will be securely held in load-carrying position as shown in Figure 1, it being impossible to dump or tilt the box until the two latches have been moved out of engagement with the lugs 52. A brake 53 is preferably provided on each wheel of the trailer whereby such wheels may be locked against rotation when it is desired to unload or dump the trailer box. These brakes are operable by means of a lever 54 mounted upon a shaft 55 at the forward end of the lower frame section. Connecting rods 56 operatively connect the brakes to the hand lever 54, the connecting rod on the side of the trailer frame opposite from the lever 54 being connected to a short arm 57 secured to the opposite end of the shaft 55. A tension spring 58 is preferably provided to normally retain the lever 54 in brake-releasing position.

A yieldable limit stop is also preferably provided to limit the tilting movement of the box 43. Such means is shown in Figure 2, and comprises a chain 59 having its lower end secured to the cross bar 18 of the upper frame section and its upper end connected to one end of a tension spring 61, having its upper end secured to the frame structure 45 secured to the underside of the box. This take-up mean also functions as a means to cushion the box 43 should it suddenly be moved from the position shown in Figure 1 to that shown in Figure 2. When the box is in normal load-receiving position, the spring 61 and chain 59 will assume the position shown in Figure 1.

Operation.

In the operation of this novel trailer dump mechanism the box 43 is loaded when in the position shown in Figures 1, 4 and 5, in which position the box will be locked to the forward end of the upper section of the trailer frame by means of the latches 48 and 49. Referring to Figure 1, it will be noted that the pivotal connection of the box frame 45 to the upper section of the trailer frame is such that the center of gravity will be located slightly ahead of the shaft 41 when the box is in normal load-receiving position. Thus, the weight of the forward end of the box will normally tend to retain the box in the position shown in Figure 1, after having been thus positioned by means of the dumping mechanism. It will also be noted that when the box is in such position the parallel links 36 and 38 will be substantially in a vertical position so that there will be no natural tendency for the weight of the box to actuate the dumping mechanism without the application of an outside force.

After the box has been loaded, and it is desired to discharge or unload the contents therein, the operator will release the latches 48 and 49 from the apertured lugs 52 secured to the forward end of the box 43. He will then grasp the brake lever 54 and forwardly move it from the position shown in Figure 1 to that shown in Figure 2, thereby locking the trailer wheels against rotation. The movement of the tractor will then be reversed; that is, it will be moved towards the trailer with the result that the upper frame section 17 of the trailer frame will be backwardly moved therewith with relation to the lower section of the trailer frame. Such relative movement of the upper frame section will cause the box to be moved from the position shown in Figure 1 to the inclined unloading position shown in Figure 2, in which position the contents will be discharged from the box. It will also be noted, by reference to Figure 2, that when the box is in dumping or unloading position, the chain 59 will be taut and the spring 61 under tension, the latter two functioning to cushion and to limit the dumping movement of the box.

As soon as the load has been discharged from the box, the operator or driver will forwardly move the tractor with respect to the lower section of the trailer frame and the trailer wheels, which will be locked against rotation by means of the brake lever 54. Such forward movement of the tractor will cause the upper section of the trailer frame to be forwardly moved from the position shown in Figure 2 to that shown in Figure 1, which will return it to its normal load-receiving position where it may again be securely locked to the forward end of the upper section 17 of the trailer frame by manipulation of the latch lever 47. The brakes 53 on the trailer wheels will then be released by manipulation of the hand lever 54, after which the tractor and trailer will be in position to receive another load and will be ready for road travel as an ordinary trailer.

By the employment of this novel trailer dumping mechanism it will be seen that no additional power equipment is required on the tractor to effect the unloading of the trailer, as such unloading is accomplished entirely by the reverse tractive power of the tractor. This novel trailer and dumping mechanism therefore is adaptable for use in connection with any standard type of tractor or other power device with which it may be used.

In Figures 6, 7 and 8, there is shown a trailer dumping mechanism of modified construction wherein the box 43 is adapted to be tilted or dumped sidewise instead of rearwardly. The frame of the form of trailer here shown is likewise constructed of two sections, the lower section comprising the opposed side beams 62 and the upper frame section comprising the side beams 63 which preferably have their forward end-portions 64 shaped to provide an arch to provide clearance for the tractor wheels 27 when turning corners. The forward end portions 64 of the beams 63 provide the connecting means between the trailer and the tractor and preferably diverge towards the coupling 65 in a manner similar to the coupling beams 24 shown and described in the previous figures. The form of structure shown in Figures 6, 7 and 8, also employs the tractive power of the tractor in effecting the dumping or tilting of the box 43.

Referring to the drawings, it will be seen that the side beams 62 of the lower frame section are preferably secured together in spaced parallel relation by means of the upright triangular shaped brackets 66 and 67, secured thereto, thereby providing a very rigid and substantial frame structure upon which the dump box 43 is mounted. Springs 13, similar to the ones shown in Figures 1 and 2, are secured to the rear ends of the beams 62 of the lower frame section to yieldably mount the frame upon the trailer axle 15 carried by the usual wheels 16. The means provided for pivotally mounting the box upon the upright triangular brackets 66 and 67 preferably consists in mounting a shaft 68 in the upper portions of the brackets upon the ends of which a pair of similar brackets 69 are mounted, such brackets preferably being suitably secured to the bottom of the box 43 by means of bolts or rivets. By thus pivotally mounting the box upon the brackets 66 and 67, as above described, it will readily be understood that the box will be capable of tilting to either side of the trailer for discharging its load, means being provided for controlling the tilting of the box, as will hereinafter be described.

The means provided for tilting the box to discharge its load consists of slidably mounting the beams 63 of the upper frame section upon the side beams 62 of the lower frame section. As shown in Figures 6, 7 and 8, guides 71 are secured to the side beams 62 of the lower frame section and in these guides the beams 63 of the upper frame section are slidably mounted. An upwardly extending lug 72 is terminally provided on each side beam 63 adapted to engage the rear guide 71 to limit the forward movement of the upper frame section with relation to the lower frame section. Downwardly extending lugs 73 are similarly provided at the forward ends of the beams 63 to limit the rearward movement thereof when the dumping mechanism is being actuated. The lugs 73 are adapted to engage the forward ends of the lower frame beams 62. A transverse shaft 74 is mounted in bearings provided in the rear end portions of the beam 63 of the upper frame section. This shaft is connected by means of links 75, to a pair of substantially upright arms 76 secured to a cross shaft 77 rotatably mounted in suitable bearings secured to the beams 62 of the lower frame section adjacent the springs 13. Similar arms 79 are terminally secured to the cross shaft 77 and one of these arms is operatively connected to one end of the outer lower corner of the box 43. The form of such connection shown in the accompanying drawings comprises a 3-piece connecting rod, the major central portion 81 thereof preferably having the relatively shorter end portions 82 and 83 pivotally connected thereto. The purpose of constructing the connecting rod as above described is to allow for the accurate movement of the oscillating arm 79 and also to allow for the oscillatory movement of the upper pivotal connection of the connecting rod to the dump box. The upper end of the connecting rod is preferably connected to the box 43 by means of a forked bracket 84 secured to the box. Such a bracket is provided on each side of the box in order to provide means whereby the box may be tilted to either side of the trailer frame. In the drawings the 3-piece connecting rod is shown mounted on the right hand side of the trailer, thereby adapting the box to be tilted to the left hand side of the trailer, as shown in Figures 7 and 8. Should it be desired to discharge the load to the right hand side of the trailer frame, then the connecting rod will be removed from the right hand side of the trailer and will be similarly mounted on the left hand side thereof, thereby adapting the box to be tilted to the right hand side of the trailer. It is to be understood, of course, that such changing of the connecting rod must be done before the box is loaded. The dump box may be provided on each side with a swinging door 85, as particularly shown in Figure 8, in order to facilitate the discharging of the material therefrom.

To effect the dumping of the structure shown and described in Figures 6, 7 and 8, the tractor, and therefore the upper section of the trailer frame, will be rearwardly moved with relation to the lower trailer frame section and the trailer wheel 16, the trailer wheels being locked against rotation by means of a brake (not shown) similar in construction to the one shown in the previous figures. Such relative movement of the upper frame section will cause the cross shaft 77 to be partially rotated by its connection with the upper frame section through the links 75 and arms 76. Such partial rotation of the shaft 77 will cause the arm 79 to be oscillated, from the position shown in Figure 6 to that shown in Figures 7 and 8, thereby causing the box to be tilted as shown. When the load has been discharged from the box, it will be returned to its normal load-receiving position by the relative forward movement of the tractor, and therefore the upper section of the trailer frame. Means (not shown) are also preferably provided to secure the box in its normal load-receiving position, as shown in Figure 1.

Having thus described our invention what we claim as new and desire to secure by Letters Patent, is:

1. The combination of a trailer comprising a lower frame section having supporting wheels and a braking means therefor, an upper frame section, parallel links arranged in front and rear pairs and pivotally connecting said upper section with said lower section, a dumping body mounted upon the rear pair of parallel links, said upper frame section having means for connection with a draft means, means for normally locking said dumping body in its horizontal loading position, whereby movement of said draft means when said trailer wheels are locked will oscillate said upper frame section and swing it and said dumping body to a tilted dumping position.

2. In a device of the class described, a wheel-supporting frame, a dumping frame thereabove, parallel links, front and rear, pivotally connecting the frames for obtaining simultaneous longitudinal and vertical movements of the dumping frame toward and away from dumping position, a body above the dump frame and having fixed connection with one of the links, and means for connecting the dump frame with a tractor, for obtaining dumping movements of said dump frame and body by tractor movements.

3. In a device of the class described, a wheel-supported frame, a dumping frame thereabove, links pivotally connecting the frames for obtaining simultaneous longitudinal and vertical movements of the dumping frame, a body fixedly connected to certain of the links, the same links having a pivoted connection with the dumping frame below the fixed connecting points of the links with the dumping frame, and means connecting the dump frame with a tractor for actuation thereby.

4. A device of the class described, a wheel-supported frame, a dumping frame thereabove, parallel links, front and rear, pivotally connecting the frames for obtaining simultaneous longitudinal and vertical movements of the dump frame, a body having fixed connection with the rear links, means for connecting the dump frame with a tractor for obtaining dumping movements of said dump frame and body, and means for limiting the operative movements of dump frame and body.

5. A wheel-supported frame, a dump frame spaced thereabove and normally substantially parallel therewith, spaced parallel links, front and rear, pivotally connecting the frames, and normally substantially vertically disposed for obtaining simultaneous longitudinal and vertical movements of the dump frame rearwardly to dumping position, a body normally engaged with the dump frame, said body fixedly connected to the rear links above the pivotal connection of the links with the dumping frame, means upon the dump frame connectible with a tractor for imparting longitudinal thrust to the dump frame, and means for limiting the swinging dumping movements of frame and body.

6. The combination of a trailer having two rear wheels and brake means for said wheels, a dumping-body supporting frame above the trailer, connectible with a draft means, means connecting said frame and trailer to obtain simultaneous translation and lowering movements of the dumping frame toward and away from dumping position, when the brakes are set, and when the draft means is operative.

7. A trailer frame having rear supporting wheels and brakes for said wheels, a dumping-body supporting frame above the trailer frame, links pivotally connecting the frames, said dumping frame being connectible to a draft means, the link connections being such that the movement of the upper frame by the draft means acts, when the brakes are set, to lower and translate said body supporting frame to dumping position, and a body rigidly connected only to certain of said links.

8. In a device of the class described, a wheel supported frame, a second frame superposed thereabove, links pivotally connecting the frames to obtain simultaneous translative and lowering and raising movements of the upper frame toward and away from the lower, and a body upon the upper frame having a fixed connection with one of the links such that said body assumes an angular dumping position with respect to the other frame when the upper frame is translated and lowered.

9. The combination of a trailer comprising a lower frame section having supporting wheels, and an upper spaced frame section adapted to be connected to a draft means, parallel links connecting said upper section with said lower section and normally in an upright position, means for forming a cushion between the sections, a dumping body above said upper section, and connected to certain of the links, and means for holding said trailer against movement, whereby movement of the draft means will oscillate said upper frame section, and move said dumping body to its dumping position.

10. In a device of the class described a frame having wheels at one end, a second frame superposed above the first and supported at one end by wheels and at that end opposite the wheels of the other frame section, links pivotally connecting the frames at opposite sides and in pairs transversely aligned for obtaining simultaneous translative and lowering movements of the upper frame, and a body having fixed connection with one of the links and lying above the upper frame.

11. In a device of the class described a frame having wheels at one end, a second frame superposed above the first and supported at one end by wheels and at that end opposite the wheels of the other frame section, links pivotally connecting the frames for obtaining simultaneous translative and lowering movements of the upper frame, and a body having fixed connection with one of the links and lying above the upper frame.

12. In a device of the class described a frame having wheels at the rear end, a second frame superposed above the first and having means at its front end to connect it to wheels, links pivotally connecting the frames for obtaining simultaneous translative and lowering movements of the upper frame rearwardly and toward the lower frame, and a body having fixed connection with one of the links and lying above the upper frame, the connection being such that said body assumes an angular dumping position with respect to the other frame, when the upper frame moves rearwardly.

In witness whereof, we have hereunto set our hands this 2nd day of January, 1925.

EDWARD R. GREER.
EMMETT L. CARSON.